(12) United States Patent
Gorokhov et al.

(10) Patent No.: US 8,181,079 B2
(45) Date of Patent: May 15, 2012

(54) DATA TRANSMISSION WITH HARQ AND INTERFERENCE MITIGATION

(75) Inventors: Alexei Gorokhov, San Diego, CA (US); Gavin Horn, La Jolla, CA (US); Mohammad J. Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 909 days.

(21) Appl. No.: 12/233,179

(22) Filed: Sep. 18, 2008

(65) Prior Publication Data

US 2009/0083601 A1    Mar. 26, 2009

Related U.S. Application Data

(60) Provisional application No. 60/974,361, filed on Sep. 21, 2007.

(51) Int. Cl.
*G06F 11/00* (2006.01)

(52) U.S. Cl. .......................... 714/748; 714/749

(58) Field of Classification Search ............... 714/748, 714/749, 750, 751, 821, 18
See application file for complete search history.

(56) References Cited

U.S. PATENT DOCUMENTS

| | | | |
|---|---|---|---|
| 6,930,981 B2 * | 8/2005 | Gopalakrishnan et al. | 370/252 |
| 7,555,269 B2 * | 6/2009 | Tamaki et al. | 455/102 |
| 7,720,501 B2 * | 5/2010 | Lundby et al. | 455/522 |
| 7,778,151 B2 * | 8/2010 | Bertrand et al. | 370/208 |
| 7,929,962 B2 * | 4/2011 | Bachl et al. | 455/424 |
| 2001/0032325 A1 | 10/2001 | Fong et al. | |
| 2004/0179557 A1 * | 9/2004 | Tong et al. | 370/537 |

FOREIGN PATENT DOCUMENTS

| | | |
|---|---|---|
| EP | 0771092 A1 | 5/1997 |
| EP | 1389848 A1 | 2/2004 |
| RU | 2235437 | 8/2004 |
| RU | 2264036 | 11/2005 |
| RU | 2267225 | 12/2005 |

(Continued)

OTHER PUBLICATIONS

Ericsson: "Options for Inter-Cell Interference Coordination (ICIC)" 3GPP Draft R3-061199; 3rd Generation Partnership Project (3GPP); Mobile Competence Centre; 650, Route Des Lucioles; F-062921 Sophia-Antipolis Cedex; France; vol. tsg_ran\WG3_lu\TSGR3_53\docs, No. Tallinn;.20060901 (Aug. 23, 2008) XP050160110.

Li, S. et al.: "WLC04-6: Network Coordination and Interference Mitigation for HSDPA and EV-DO Forward Link," Global Telecommunications Conference, 2006 GLOBECOM '06 IEEE, IEEE, PI, pp. 1-5 (Nov. 1, 2006) XP031075640.

(Continued)

*Primary Examiner* — Dieu-Minh Le
(74) *Attorney, Agent, or Firm* — Donald C. Kordich

(57) ABSTRACT

Techniques for transmitting data with hybrid automatic retransmission (HARQ) and interference mitigation are described. In one design, a transmitter processes a packet of data in accordance with a rate and sends at least one transmission of the packet to a receiver with HARQ. In one design, the transmitter sends a trigger message to the receiver to trigger the receiver to send a request to reduce interference to interfering station(s). The transmitter may send a first transmission of the packet (i) after the trigger message, e.g., in consecutive frames of a single HARQ interlace, or (ii) along with the trigger message in the same frame. The number of transmissions to send for the packet may be dependent on whether the interfering station(s) reduce interference to the receiver. The packet transmission may terminate early if interference mitigation is successful or may terminate late if interference mitigation is unsuccessful.

46 Claims, 10 Drawing Sheets

FOREIGN PATENT DOCUMENTS

| | | |
|---|---|---|
| RU | 2295833 | 3/2007 |
| WO | WO0176098 A2 | 10/2001 |
| WO | WO0180477 | 10/2001 |
| WO | WO0233876 A1 | 4/2002 |
| WO | WO03092213 A1 | 11/2003 |
| WO | WO2006132835 A2 | 12/2006 |

OTHER PUBLICATIONS

International Search Report, PCT/US2008/077067—International Search Authority—European Patent Office, Mar. 30, 2009.

Written Opinion, PCT/US2008/077067—International Search Authority—European Patent Office, Mar. 30, 2009.

* cited by examiner

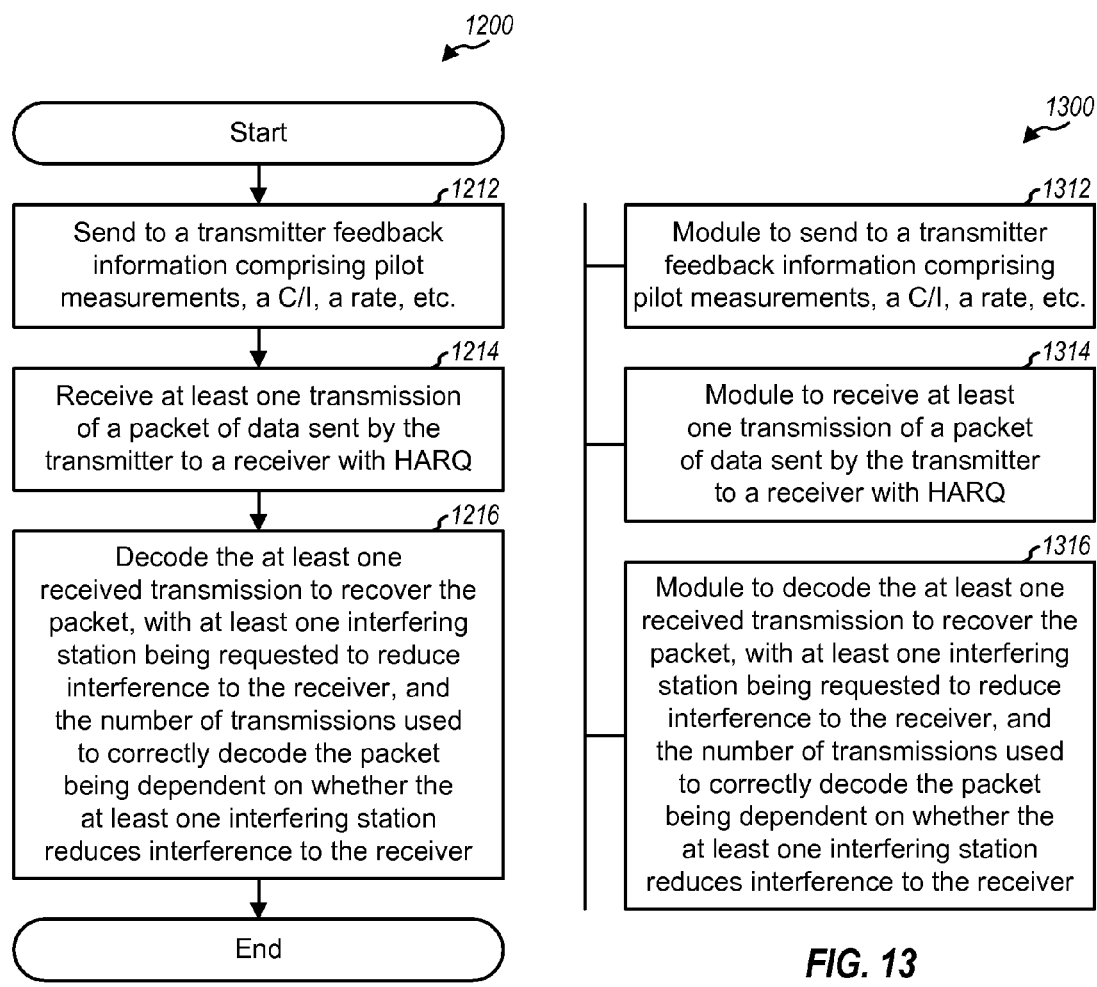

DATA TRANSMISSION WITH HARQ AND INTERFERENCE MITIGATION

The present application claims priority to provisional U.S. application Ser. No. 60/974,361, entitled "LOW LATENCY DOWNLINK INTERFERENCE AVOIDANCE BASED ON H-ARQ," filed Sep. 21, 2007, assigned to the assignee hereof and incorporated herein by reference.

BACKGROUND

I. Field

The present disclosure relates generally to communication, and more specifically to data transmission techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. A terminal may communicate with a base station via the forward and reverse links. The forward link (or downlink) refers to the communication link from the base station to the terminal, and the reverse link (or uplink) refers to the communication link from the terminal to the base station.

A base station may transmit data to one or more terminals on the forward link and may receive data from one or more terminals on the reverse link. On the forward link, data transmissions from the base station may observe interference due to data transmissions from neighbor base stations. On the reverse link, data transmission from each terminal may observe interference due to data transmissions from other terminals communicating with neighbor base stations. For both the forward and reverse links, the interference due to interfering base stations and interfering terminals may degrade performance.

SUMMARY

Techniques for transmitting data with hybrid automatic retransmission (HARQ) and interference mitigation in a wireless communication system are described herein. HARQ may be used to send a variable number of transmissions for a data packet and can handle uncertainty in channel conditions with small loss of capacity. Interference mitigation may be used to reduce interference on specific resources but may have high initial latency. A combination of HARQ and interference mitigation may be used for data transmission in order to reduce initial latency and capture most of the gains provided by HARQ.

In one design, a transmitter may process a packet of data in accordance with a rate and may send at least one transmission of the packet to a receiver with HARQ. At least one interfering station may be requested to reduce interference to the receiver. The number of transmissions to send for the packet may be dependent on whether the interfering station(s) reduce interference to the receiver. The packet transmission may terminate early if interference mitigation is successful or may terminate late if interference mitigation is unsuccessful.

In one design of data transmission on the forward link, the transmitter (e.g., a base station) may send a trigger message to the receiver (e.g., a terminal). This message may trigger the receiver to send a request to reduce interference to interfering base station(s). In one design, the transmitter may send a first transmission of the packet after the trigger message, e.g., in consecutive frames of a single HARQ interlace. The first transmission may observe less interference if the request to reduce interference is granted by the interfering base station(s). In another design, the transmitter may send the first transmission of the packet along with the trigger message in the same frame. In this design, the first transmission may observe interference from the interfering base station(s).

In one design of data transmission on the reverse link, the transmitter (e.g., a terminal) may send a request for resources to the receiver (e.g., a base station). This request for resources may trigger the receiver to send a request to reduce interference to interfering terminal(s). The transmitter may send a first transmission of the packet after the request for resources in consecutive frames of a single HARQ interlace. The first transmission may observe less interference if the request to reduce interference is granted by the interfering terminal(s).

Various aspects and features of the disclosure are described in further detail below.

BRIEF DESCRIPTION OF THE DRAWINGS

FIG. 12 shows a process for receiving data.

FIG. 13 shows an apparatus for receiving data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
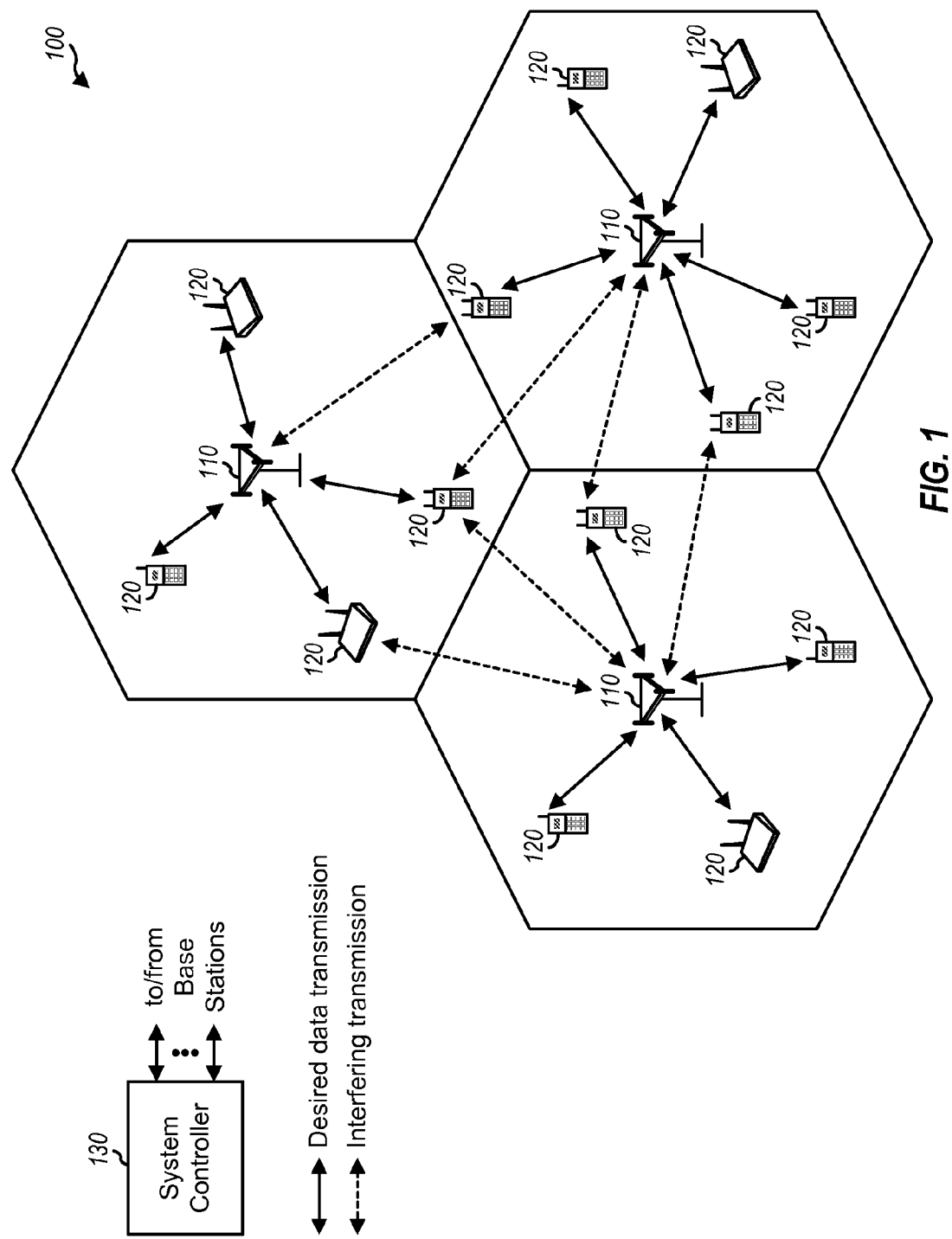
FIG. 1 shows a wireless communication system.

FIG. 1 shows a wireless communication system 100, which may include a number of base stations 110 and other network entities. A base station may be a fixed station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used. A base station may provide communication coverage for a macro cell, a pico cell, a femto cell, and/or other types of cell. A macro cell may cover a relatively large geographic area (e.g., several kilometers in radius) and may support communication for all terminals with service subscription in the system. A pico cell may cover a relatively small geographic area and may support communication for all terminals with service subscription. A femto cell may cover a relatively small geographic area (e.g., a home) and may support communication for a set of terminals having association with the femto cell (e.g., terminals belonging to residents of the home). The techniques described herein may be used for all types of cell.

A system controller 130 may couple to a set of base stations and provide coordination and control for these base stations. System controller 130 may be a single network entity or a collection of network entities. System controller 130 may communicate with the base stations via a backhaul, which is not shown in FIG. 1 for simplicity.

Terminals 120 may be dispersed throughout the system, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, etc. A terminal may communicate with a serving base station and may cause interference to and/or receive interference from one or more interfering base stations. A serving base station is a base station designated to serve a terminal on the forward and/or reverse link. An interfering base station is a base station causing interference to a terminal on the forward link and/or receiving interference from the terminal on the reverse link. In FIG. 1, a solid line with double arrows indicates desired data transmission between a terminal and a serving base station. A dashed line with double arrows indicates interfering transmission between a terminal and an interfering base station.

The system may support HARQ in order to improve reliability of data transmission. For HARQ, a transmitter may send a transmission of a packet and may send one or more additional transmissions, if needed, until the packet is decoded correctly by a receiver, or the maximum number of transmissions has been sent, or some other termination condition is encountered.

Figure 2:
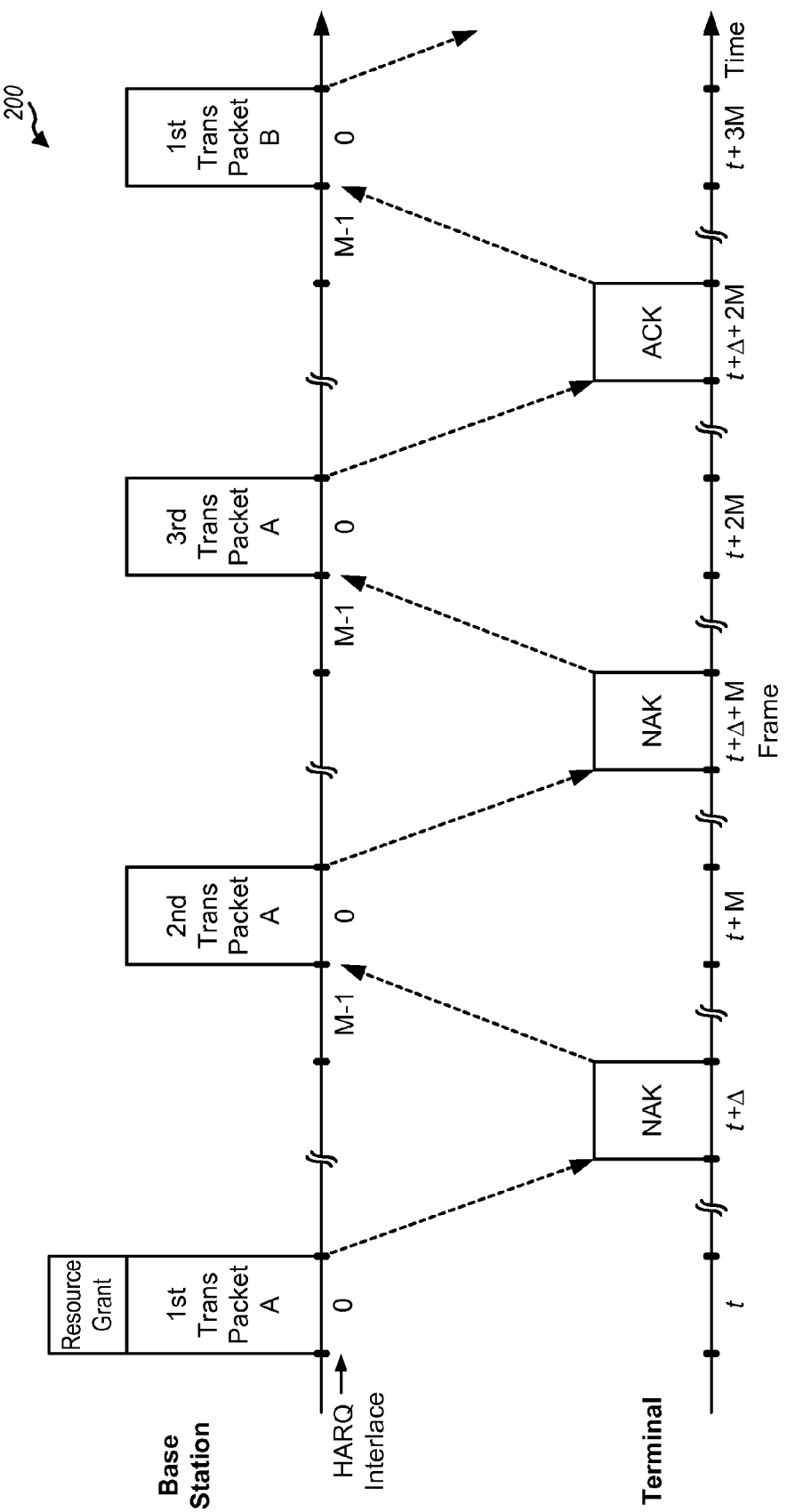
FIG. 2 shows data transmission on the forward link with HARQ.

FIG. 2 shows an example data transmission on the forward link with HARQ. The transmission timeline may be partitioned into units of frames. Each frame may cover a predetermined time duration, e.g., 10 milliseconds (ms) in LTE or approximately 1 ms in UMB. A frame may also be referred to as a subframe, a slot, etc.

In the example shown in FIG. 2, a base station has data to send to a terminal and processes a data packet A in accordance with a selected rate to obtain data symbols. A rate may be equivalent to and/or may be referred to as a transport format, a packet format, a modulation and coding scheme (MCS), a channel quality indicator (CQI), etc. The base station sends a resource grant as well as a first transmission of packet A to the terminal. The resource grant may indicate the resources used for data transmission, the selected rate, etc. The terminal receives and processes the first transmission in accordance with the selected rate. In this example, the terminal decodes packet A in error and sends a negative acknowledgement (NAK). The base station receives the NAK and sends a second transmission of packet A. The terminal receives the second transmission and processes the first and second transmissions in accordance with the selected rate. The terminal again decodes packet A in error and sends another NAK. The base station receives the NAK and sends a third transmission of packet A. The terminal receive the third transmission and processes the first, second and third transmissions in accordance with the selected rate. The terminal decodes packet A correctly and sends an acknowledgement (ACK). The base station receives the ACK and processes and sends another data packet B in similar manner.

The base station may process and send a packet such that the packet can be decoded correctly with high probability after a target number of transmissions. Each transmission of the packet may be referred to as an HARQ transmission and may include different redundancy information (e.g., a different set of data symbols) for the packet. The target number of transmissions is also referred to as a target termination for the packet. A rate may be selected for the packet based on received signal quality such that the target termination can be obtained for the packet.

For synchronous HARQ, M HARQ interlaces with indices of 0 through M−1 may be defined for each of the forward and reverse links, where M may be equal to 4, 6, 8 or some other integer value. The HARQ interlaces may also be referred to as HARQ instances. Each HARQ interlace may include frames that are spaced apart by M frames. For example, HARQ interlace m may include frames t+m, t+m+M, t+m+2M, etc., where $m \in \{0, \ldots, M-1\}$ and t is a frame index. A packet may be sent on one HARQ interlace, and all transmissions of the packet may be sent in frames that are spaced apart by M frames.

For asynchronous H-ARQ, each HARQ transmission may be scheduled by a base station and may be sent in any frame. For a given packet, the amount of resources, the location of the resources, the rate and/or other parameters may change for different transmissions of the packet. The techniques described herein may be used for both synchronous and asynchronous HARQ. For clarity, much of the description below is for synchronous HARQ.

A terminal may communicate with a serving base station on the forward and/or reverse link. On the forward link, the terminal may observe high interference from an interfering base station. This may be the case, for example, if the serving base station covers a pico cell or a femto cell and has much lower transmit power than the interfering base station. On the reverse link, the serving base station may observe high interference from an interfering terminal. The interference on each link may degrade performance of data transmission on that link.

Short-term interference mitigation may be used to mitigate (e.g., to avoid or reduce) interference on a given link in order to improve performance of data transmission. The interference mitigation may blank or reduce transmit power of interfering transmission so that a higher received signal quality can be achieved for a desired data transmission. Received signal quality may be given by a carrier-to-interference ratio (C/I), a signal-to-noise-and-interference ratio (SINR), etc. For clarity, C/I is used in much of the description below.

Figure 3:
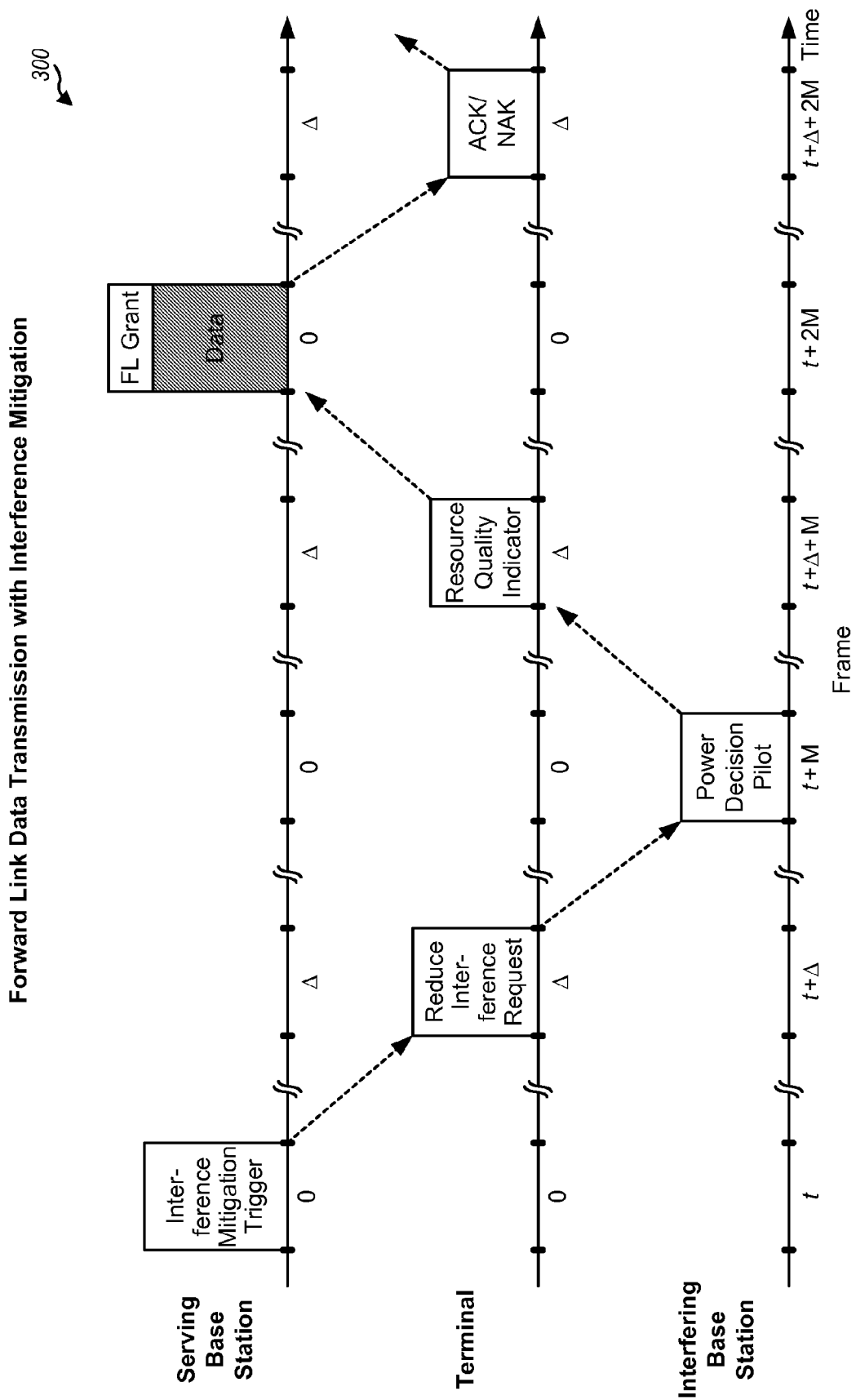
FIG. 3 shows forward link data transmission with interference mitigation.

FIG. 3 shows a design of a forward link data transmission scheme 300 with interference mitigation. A serving base station may have data to send to a terminal and may have knowledge that the terminal is observing high interference on the forward link. The serving base station may receive pilot reports from the terminal, and the pilot reports may indicate and/or identify strong interfering base stations. The serving base station may send an interference mitigation trigger message (or simply, a trigger message) to the terminal in frame t to trigger interference mitigation. The trigger message may direct the terminal to request interfering base stations to reduce interference on the forward link and may convey one or more resources to reduce interference, a priority of the data to send, and/or other information. The priority may be determined based on quality of service (QoS) level, accumulated buffer level, etc.

The terminal may receive the trigger message in frame t and may send a reduce interference request message in frame t+Δ. In one design, the terminal may send the reduce interference request message only to base stations that are strong interferers to the terminal on the forward link. The terminal may identify these strong interfering base stations based on forward link pilots received from these base stations. In another design, the terminal may send the reduce interference request message to all neighbor base stations that can receive the message. In general, the reduce interference request message may be a unicast message sent to a specific base station, a multi-cast message sent to a set of base stations, or a broadcast message sent to all base stations. In any case, the reduce interference request message may request the interfering base stations to reduce interference on specified resources and may also convey and the urgency of the request and/or other information.

An interfering base station may receive the reduce interference request message from the terminal and may grant or dismiss the request. If the request is granted, then the interfering base station may determine a transmit power level that it will use on the specified resources based on various factors such as its forward link buffer status, the urgency of the request, etc. The interfering base station may convey the transmit power level that it will use on the specified resources via a power decision pilot sent at that transmit power level. The transmit power level conveyed via the power decision pilot may be a tentative decision in frame t+M. The interfering base station may use a higher or lower transmit power level on the specified resources based on QoS, channel quality conditions, and/or other factors.

The terminal may receive power decision pilots from all interfering base stations as well as a pilot from the serving base station. The terminal may estimate C/I of the specified resources based on the received pilots. The power decision pilots may allow the terminal to more accurately estimate C/I. The terminal may determine a resource quality indicator (RQI), which may convey a C/I value, a rate, and/or other information for the specified resources. The terminal may send the RQI in frame t+Δ+M.

The serving base station may receive the RQI from the terminal and may schedule the terminal for data transmission on assigned resources, which may include all or a subset of the specified resources. The serving base station may select a rate based on the RQI and may process a data packet in accordance with the selected rate. The serving base station may generate a forward link (FL) grant, which may include the assigned resources, the selected rate, and/or other information. The serving base station may send the FL grant and a first transmission of the packet to the terminal in frame t+2M.

The terminal may receive the FL grant and the first transmission of the packet, decode the received transmission in accordance with the selected rate, and generate an ACK or a NAK based on the decoding result. The terminal may send the ACK or NAK in frame t+Δ+2M. The serving base station may send another transmission of the packet in frame t+3M if a NAK is received and may terminate or send a new packet if an ACK is received.

FIG. 3 shows an example forward link transmission scheme with interference mitigation. This transmission scheme may be used to enable inter-cell fairness control and to improve data rates for terminals observing poor interference conditions, especially in a heterogeneous deployment where (i) different base stations may have different transmit power levels and/or (ii) some base stations may have restricted access for closed subscriber groups (CSGs). This transmission scheme may be summarized by the following steps:

A. The serving base station sends a trigger message to the terminal to initiate interference mitigation, B. The terminal sends a reduce interference request to one or more interfering base stations in response to the trigger message, C. Each interfering base station determines whether to grant or dismiss the request and conveys its decision, e.g., by advertising its transmit power level for the specified resources, D. The terminal estimates the channel conditions based on the grant/dismiss information from the interfering base stations and sends the estimated channel conditions to the serving base station, and E. The serving base station assigns resources and selects a rate based on the reported channel conditions and sends data to the terminal at the selected rate.

The transmission scheme in FIG. 3 may enable accurate estimation of channel conditions and selection of an appropriate rate on a frame-by-frame basis, irrespective of variations in interference due to grant/dismiss decisions by the interfering base stations. However, some drawbacks of the transmission scheme include high initial latency and relatively high signaling overhead on the forward and reverse links. In particular, there is a delay of 2M frames from the time the serving base station decides to serve the terminal in frame t to the time the first transmission is sent in frame t+2M.

In an aspect, a combination of HARQ and interference mitigation may be used for data transmission in order to reduce initial latency and capture most of the gains provided by HARQ. HARQ can handle uncertainty in channel conditions with small loss of capacity. For HARQ, the spectral efficiency of a packet progressively reduces after each transmission of the packet. A receiver can correctly decode the packet at a point when the spectral efficiency of the packet matches channel capacity accumulated over all transmissions of the packet. The ability of HARQ to efficiently handle uncertainty in channel conditions may be exploited to handle uncertainty in interference mitigation. In particular, a serving base station may send a packet to a terminal such that the packet can be (i) decoded correctly early (e.g., after one or few transmissions) if a reduce interference request is granted by some or all interfering base stations or (ii) decoded correctly later (e.g., after multiple transmissions) if interference mitigation is unsuccessful.

Figure 4:
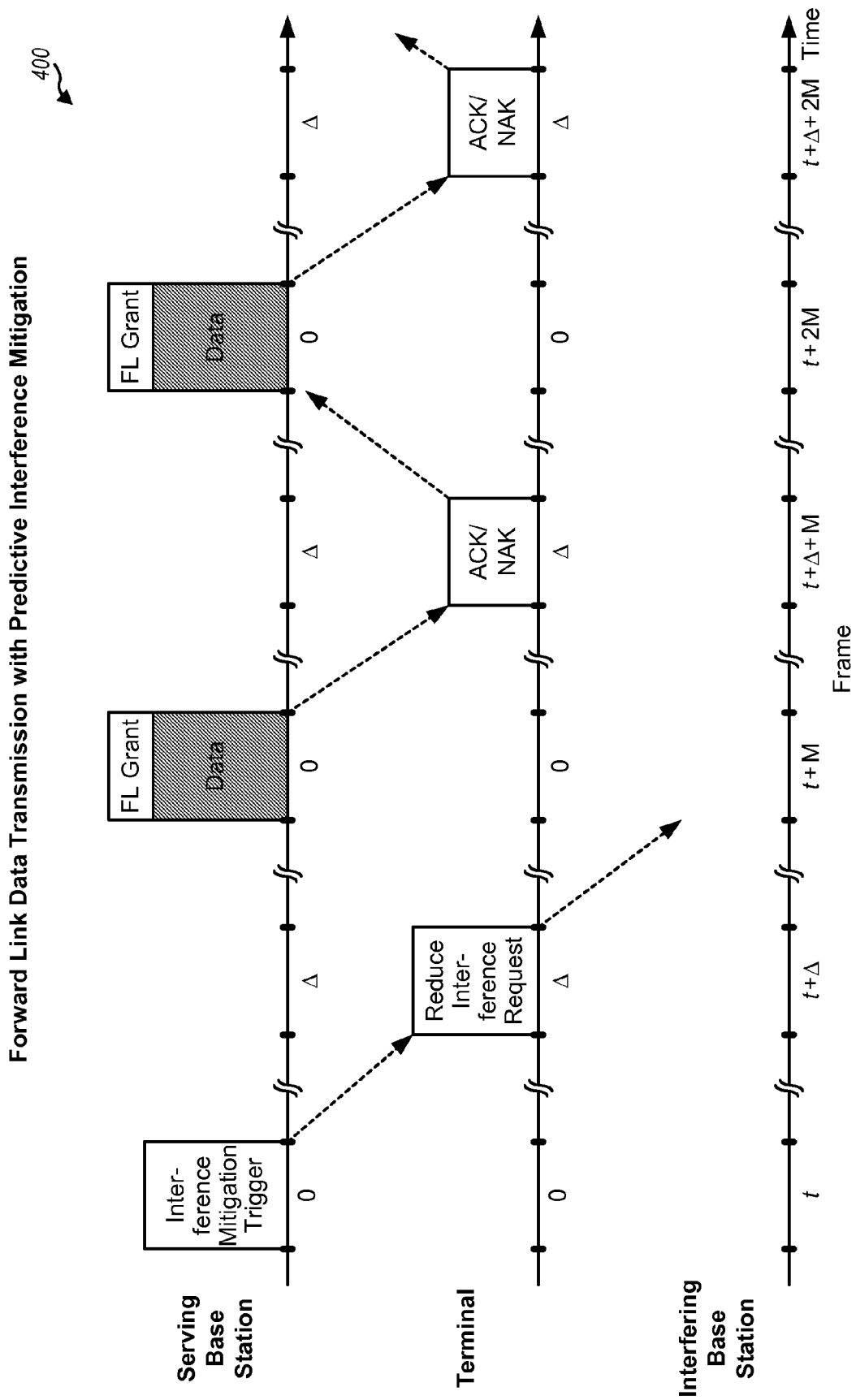
FIGS. 4 and 5 show two designs of forward link data transmission with predictive interference mitigation.

FIG. 4 shows a design of a forward link data transmission scheme 400 with predictive interference mitigation. A serving base station may have data to send to a terminal and may have knowledge that the terminal is observing high interference on the forward link. The serving base station may send an interference mitigation trigger message to the terminal in frame t to trigger interference mitigation. The trigger message may convey one or more resources to reduce interference, a priority of the data to send, and/or other information. In one design, the trigger message may include information regarding which interfering base station(s) should be targeted by a subsequent reduce interference request message. The trigger message may explicitly convey the interfering base stations, which may be identified by the serving base station based on pilot reports from the terminal. The trigger message may also specify a target C/I, and the terminal may identify interfering base station(s) that need to reduce their transmit powers in order to achieve the target C/I. In any case, the terminal may receive the trigger message and may send a reduce interference request message in frame t+Δ to request interfering base stations to reduce interference on the specified resources.

The serving base station may select a rate based on information available for the terminal. In one design, the rate may be selected such that a packet can be correctly decoded later with a high probability if interference is not reduced (as opposed to being decoded in error). The selected rate may thus target late HARQ termination. The serving base station may process a data packet in accordance with the selected rate. The serving base station may send an FL grant as well as a first transmission of the packet to the terminal in frame t+M.

The terminal may receive the FL grant and the first transmission of the packet, decode the received transmission in accordance with the selected rate, and generate an ACK or a NAK based on the decoding result. The terminal may send the ACK or NAK in frame t+Δ+M. The serving base station may send another transmission of the packet in frame t+2M if a NAK is received and may terminate or send a new packet if an ACK is received. The number of transmissions to send for the packet may be dependent on whether the interfering base stations reduce interference on the specified resources, as requested by the terminal in frame t+Δ. If the interfering base stations reduce their transmit powers, then the terminal may observe less interference and may be able to correctly decode the packet with one or few transmissions. However, if the interfering base stations decide not to reduce their transmit powers, then the terminal may still be able to correctly decode the packet after more transmissions. The number of transmissions to send for the packet may thus be dependent on whether interference mitigation is achieved and may be adaptively handled with HARQ.

In the design shown in FIG. 4, there is a delay of M frames from the time the serving base station decides to serve the terminal in frame t to the time the first transmission is sent in frame t+M. The design in FIG. 4 thus reduces initial latency from 2M frames to M frames.

Figure 5:
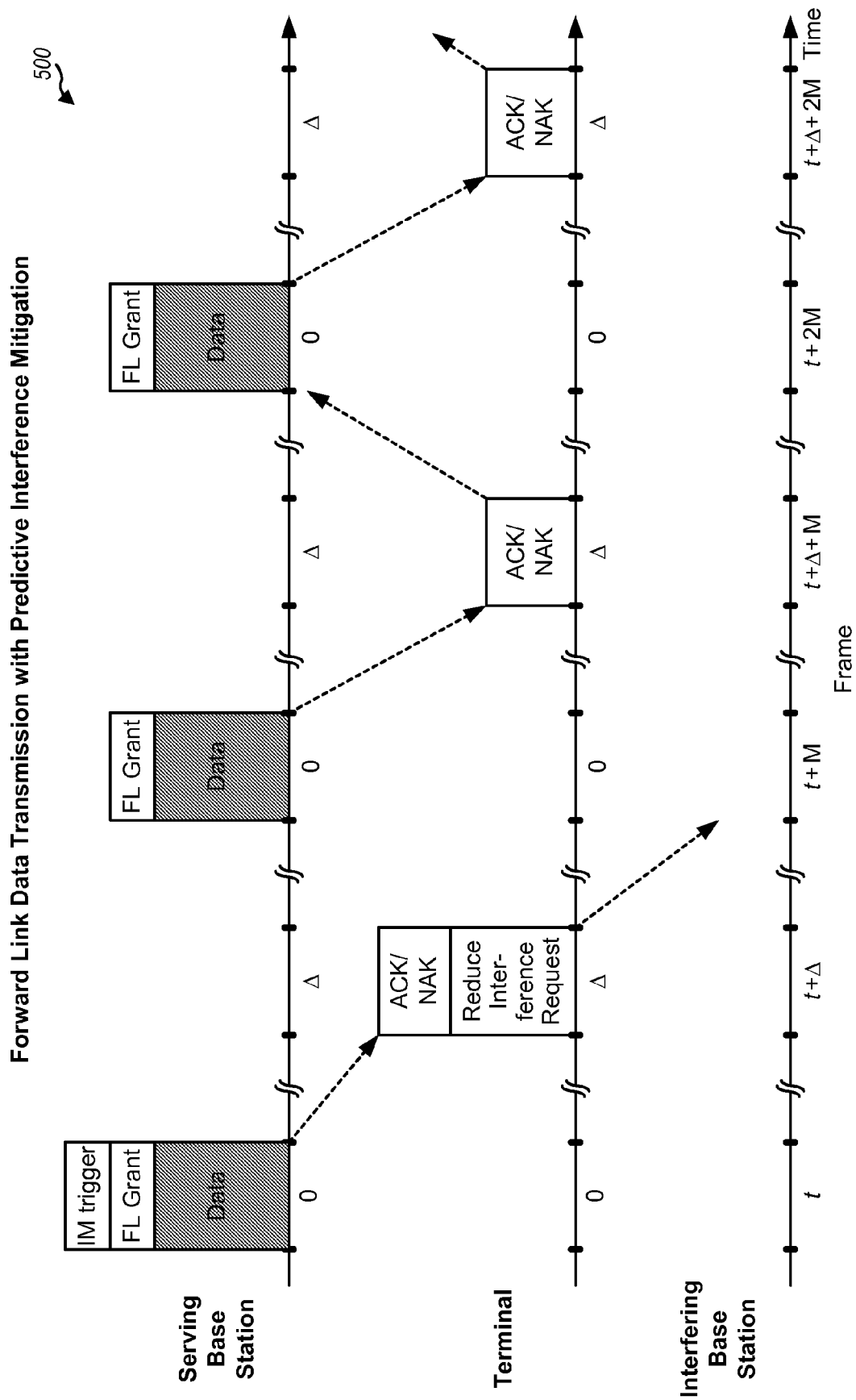

FIG. 5 shows a design of a forward link data transmission scheme 500 with predictive interference mitigation. A serving base station may have data to send to a terminal and may have knowledge that the terminal is observing high interference on the forward link. The serving base station may select a rate based on information available for the terminal and may process a data packet in accordance with the selected rate. The serving base station may send an FL grant, a first transmission of the packet, and an interference mitigation (IM) trigger message to the terminal in frame t. In one design, the trigger message may include the information described above for FIG. 3 or 4. In another design, the trigger message may comprise a single bit (e.g., in the FL grant). This single bit may be set to (i) a first value to direct the terminal to send a reduce interference request message or (ii) a second value to direct the terminal not to send the reduce interference request message. The trigger message may also be conveyed in other manners.

The terminal may receive the FL grant, the first transmission of the packet, and the interference mitigation trigger message. The terminal may send a reduce interference request message in frame t+Δ to request interfering base stations to reduce interference on resources used for the first transmission of the packet. The terminal may also decode the received transmission in accordance with the selected rate and may generate an ACK or a NAK based on the decoding result. The terminal may send the ACK or NAK in frame t+Δ. The serving base station may send another transmission of the packet in frame t+M if a NAK is received and may terminate or send a new packet if an ACK is received. The number of transmissions to send for the packet may be dependent on whether the interfering base stations reduce interference on the specified resources, as requested by the terminal in frame t+Δ.

In the design shown in FIG. 5, there is no delay from the time the serving base station decides to serve the terminal in frame t to the time the first transmission is sent in frame t. The design in FIG. 5 thus reduces initial latency from 2M frames to zero frames.

A packet may be processed and sent such that it has a spectral efficiency of S(n) after the n-th transmission of the packet, where n=1, . . . , N, and N is the maximum number of transmissions of the packet. A spectral efficiency of S(n) may require a C/I of C/I(n) or better for reliable decoding. HARQ with a maximum of N transmissions can thus support a range of C/Is from C/I(1) to C/I(N). To ensure low probability of packet error, a rate may be selected such that the packet can be decoded correctly with a target number of transmissions (Q) that is less than the maximum number of transmissions. A target termination of Q means that a packet can be decoded correctly with high probability after Q transmissions. For example, if the maximum number of transmissions is 6, then the target termination may be 3 or 4.

A rate may be selected in various manners for the transmission schemes shown in FIGS. 4 and 5. In one design, a rate may be selected to achieve an early target termination of Q_early, which may correspond to the first frame in which reduced interference might be observed. For the transmission scheme shown in FIG. 4, a rate may be selected to achieve an early target termination of Q_early=1 since the first transmission might benefit from reduced interference. For the transmission scheme shown in FIG. 5, a rate may be selected to achieve an early target termination of Q_early=2 since the first transmission will not benefit from interference mitigation and will likely be decoded in error but the second transmission might benefit from interference mitigation. For both transmission schemes, a C/I with successful interference mitigation may be estimated and denoted as C/I_high. A rate may then be selected such that the required C/I after Q_early transmissions is less than C/I_high. For the transmission scheme shown in FIG. 5, the first transmission will likely observe high interference, and the second transmission may be the first one with reduced interference. The rate may thus be selected such that a packet can be decoded with just the second transmission, and the first and second transmissions may have an effective spectral efficiency that is closer to S(1) than S(2).

In another design, a rate may be selected to achieve a late target termination of Q_late and assuming that interference mitigation will be unsuccessful. A C/I without interference mitigation may be estimated and denoted as C/I_low. A rate may then be selected such that the required C/I after Q_late transmissions is less than C/I_low. A packet may be decoded correctly early if the actual C/I is better than C/I_low due to successful interference mitigation.

In yet another design, a rate may be selected to achieve an early target termination of Q_early and assuming that interference mitigation will be successful, as described above. However, if the assumption turns out to be wrong and a NAK is received after Q_early transmissions, then the rate may be adjusted to achieve a late target termination of Q_late and assuming that interference mitigation will be unsuccessful. The rate may thus be adaptively changed for a packet depending on whether or not interference mitigation is successful. The adaptive rate change may be signaled to the terminal or may be known a priori by both the serving base station and the terminal.

A range of spectral efficiencies may be covered by HARQ and may be given by a ratio of the late termination target (e.g., 3 or 4 in the example above) to the early termination target (e.g., 1 or 2 for the designs shown in FIGS. 4 and 5). Hence, a late-to-early termination target ratio range of between 2 to 4 may be covered by HARQ and may translate to (i) a C/I range of 3 to 6 decibels (dB) in a low C/I region or (ii) a higher C/I range in medium to high C/I region (since rate is a logarithmic function of C/I). The transmission schemes in FIGS. 4 and 5 may be used in scenarios where moderate improvements in C/I can be obtained with interference mitigation. These scenarios may be common in typical network deployments. The transmission schemes in FIGS. 4 and 5 may also be used in scenarios with strong dominant interferers if the spectral efficiency S(Q) achieved in the presence of strong interference can be supported and if improvement in spectral efficiency by a factor of 2 to 3 due to interference mitigation is acceptable.

The transmission scheme shown in FIG. 3 may be used in scenarios where a large change in C/I can be obtained with interference mitigation. As an example, in a scenario with a strong dominant interferer, C/I may change by a large amount depending on whether the dominant interferer grants or dismisses a reduce interference request and whether the dominant interferer reduces its transmit power by a large amount in order to meet data requirements of the terminal being served.

A terminal may measure the received power of each base station detectable by the terminal. C/I_low without interference mitigation and C/I_high with interference mitigation may be expressed as:

$$C/I\_low = \frac{P_S}{N_0 + P_1 + \ldots + P_K + P_{other}}, \quad \text{Eq (1)}$$

$$C/I\_high = \frac{P_S}{N_0 + P_{other}}, \quad \text{Eq (2)}$$

where
  $P_S$ is the received power of the serving base station,
  $P_k$, for k=1, ..., K, is the received power of the k-th interfering base station,
  $P_{other}$ is the received power of other transmitter stations, and
  $N_0$ is thermal noise at the terminal.

The received power of each base station may be measured based on pilot and/or other transmissions from that base station. C/I_low in equation (1) assumes that all K interfering base stations will dismiss a reduce interference request from the terminal and continue to transmit at their nominal transmit power levels. C/I_high in equation (2) assumes that the K interfering base stations will grant a reduce interference request from the terminal and reduce their transmit powers to zero or low levels. C/I_high may be computed in an "open loop" manner with the interfering base stations transmitting at nominal transmit power levels without interference mitigation. In this case, the received powers of the interfering base stations may be measured and excluded from the denominator, as shown in equation (2). C/I_high may also be computed in a "closed loop" manner with the interfering base stations transmitting at zero or low transmit power levels with interference mitigation. In this case, $P_{other}$ may include received powers of the interfering base stations.

A look-up table of rate versus required C/I may be determined for each target termination of interest based on computer simulation, empirical measurements, etc. For early target termination, C/I_high may be provided to an appropriate look-up table (e.g., for a target termination of 1 or 2), and this table may provide a rate supported by this C/I. For late target termination, C/I_low may be provided to an appropriate look-up table (e.g., for a target termination of 3 or 4), and this table may provide a rate supported by this C/I.

For the transmission schemes shown in FIGS. 4 and 5, the serving base station may select a rate based on information available for the terminal. In one design, the terminal may send reports containing pilot measurements for detectable base stations to the serving base station. The serving base station may compute C/I_low or C/I_high based on the pilot measurements and may select a rate based on the computed C/I. In another design, the terminal may compute C/I_low or C/I_high based on the pilot measurements. The terminal may then send the computed C/I or a corresponding rate to the serving base station. In general, the terminal may make pilot measurements for detectable base stations, and the terminal or the serving base station may perform C/I computation and rate selection.

In one design, the terminal may periodically send reports containing feedback information to the serving base station. The feedback information may comprise pilot measurements, C/I, rate, and/or other information. The serving base station may use the latest feedback information to select a rate for the terminal when there is data to send. In another design, the terminal may send reports when requested by the serving base station. In yet another design, the terminal may send reports whenever pertinent information becomes available. For example, the serving base station may send a sequence of packets to the terminal. The serving base station may select a rate for the first packet based on available information. The terminal may measure C/I of the first packet (e.g., with interference mitigation) and may send the measured C/I or a corresponding rate to the serving base station. The serving base station may then use the reported C/I or rate for the next packet to send to the terminal. In general, the terminal may send any information usable to select a rate and may send the information in any manner, e.g., periodically, when triggered, etc.

Figure 6:
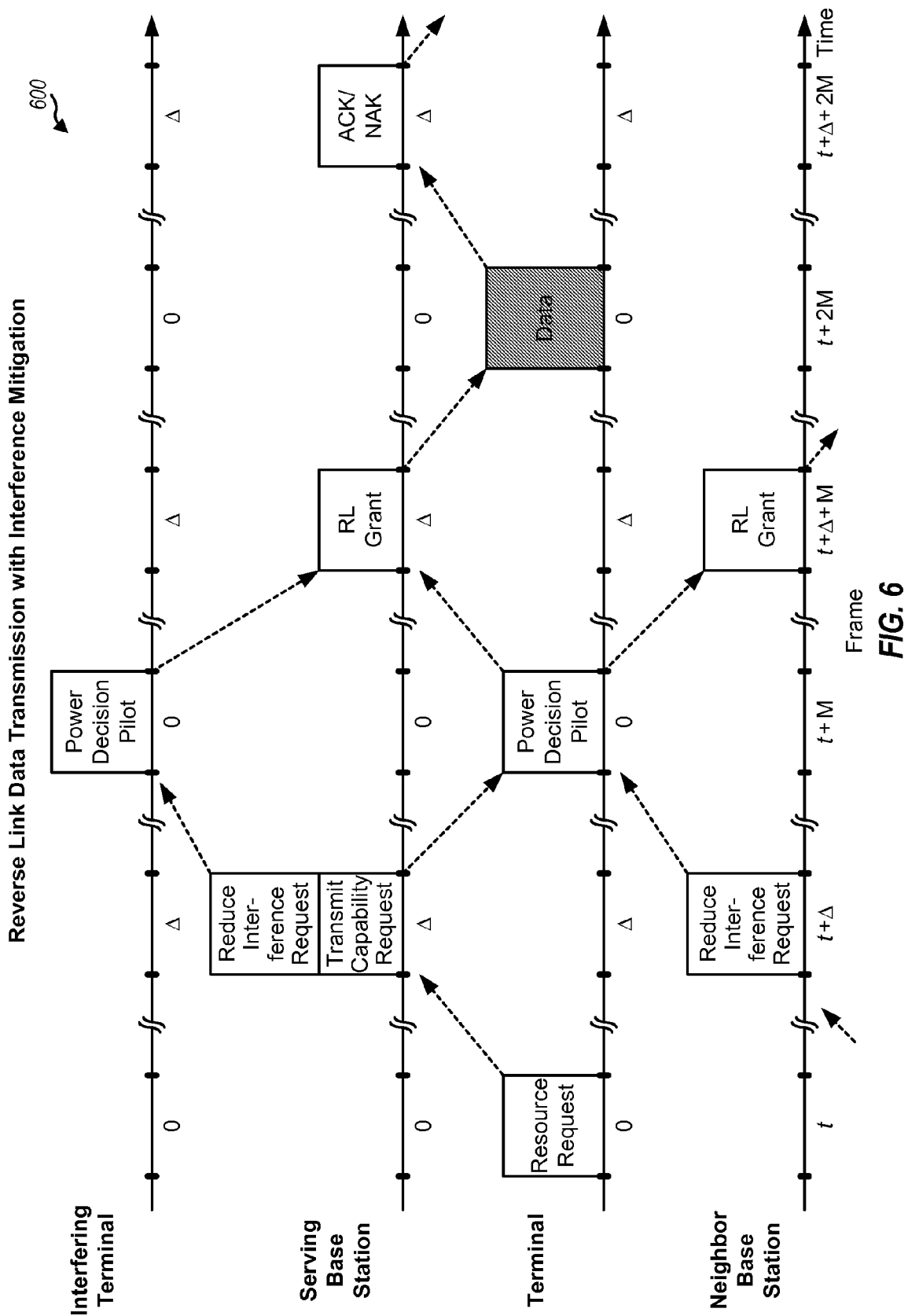
FIG. 6 shows reverse link data transmission with interference mitigation.

FIG. 6 shows a design of a reverse link data transmission scheme 600 with interference mitigation. A terminal may have data to send to a serving base station and may send a resource request in frame t. The resource request may include a buffer size at the terminal, an indication of the urgency of the resource request, etc. The serving base station may receive the resource request in frame t and may send a transmit capability request message to the terminal in frame t+Δ to ask for the transmit power capability of the terminal. The serving base station may also send a reduce interference request message in frame t+Δ to request interfering terminals to reduce interference on one or more resources.

The terminal may receive the transmit capability request message from the serving base station and may also receive reduce interference request messages from neighbor base stations. For simplicity, only one neighbor base station is shown in FIG. 6. The terminal may determine the maximum transmit power level that it can use on the specified resources based on the reduce interference request messages from the neighbor base stations. The terminal may convey this maximum transmit power level via a power decision pilot that is sent at this transmit power level in frame t+M.

The serving base station may receive the power decision pilots from the terminal as well as the interfering terminals and may determine the C/I of the specified resources based on the received pilots. The serving base station may select a rate for the terminal based on the C/I. The serving base station may generate an RL grant, which may include the assigned resources, the selected rate, the transmit power level to use for the assigned resources, and/or other information. The serving base station may send the RL grant to the terminal in frame t+Δ+M. The terminal may receive the RL grant, process a packet in accordance with the selected rate, and send a first transmission of the packet on the assigned resources in frame t+2M.

The serving base station may receive the first transmission from the terminal, decode the received transmission, and generate an ACK or a NAK based on the decoding result. The serving base station may send the ACK or NAK in frame t+Δ+2M. The terminal may send another transmission of the packet in frame t+3M if a NAK is received and may terminate or send a new packet if an ACK is received.

FIG. 6 shows an example reverse link data transmission scheme with interference mitigation. Interference mitigation on the reverse link may also be implemented in other manners. The transmission scheme in FIG. 6 may enable accurate estimation of channel conditions. However, some drawbacks of the transmission scheme include high initial latency and relatively high signaling overhead. In particular, there is a delay of 2M frames from the time the terminal sends a resource request in frame t to the time the first transmission is sent in frame t+2M.

Figure 7:
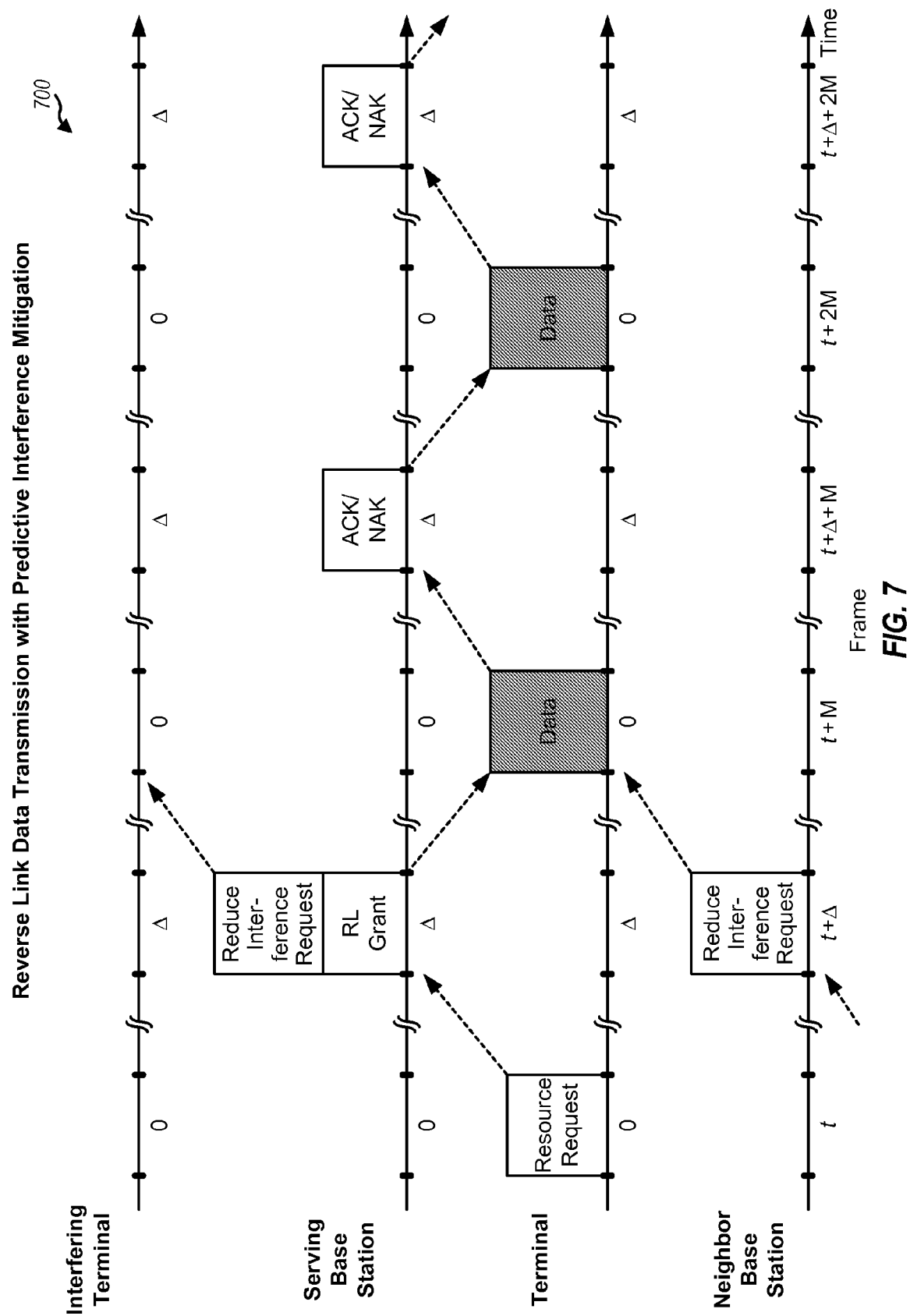
FIG. 7 shows a design of reverse link data transmission with predictive interference mitigation.

FIG. 7 shows a design of a reverse link data transmission scheme 700 with predictive short-term interference mitigation. A terminal may have data to send to a serving base station and may send a resource request in frame t. The resource request may include a buffer size at the terminal, an urgency indication, etc. The serving base station may receive the resource request and may select a rate based on information available for the terminal. The selected rate may be for an early target termination assuming successful interference mitigation or a late target termination assuming unsuccessful interference mitigation, as described above. The serving base station may send an RL grant comprising the selected rate, assigned resources, and/or other information to the terminal in frame t+Δ. The serving base station may also send a reduce interference request message to interfering terminals in frame t+Δ.

The terminal may receive the RL grant, process a packet in accordance with the selected rate, and send a first transmission of the packet on the assigned resources in frame t+M. The serving base station may receive the first transmission from the terminal, decode the received transmission, and generate an ACK or a NAK based on the decoding result. The serving base station may send the ACK or NAK in frame t+Δ+M. The terminal may send another transmission of the packet in frame t+2M if a NAK is received and may terminate or send a new packet if an ACK is received.

The number of transmissions to send for the packet may be dependent on whether the interfering terminals reduce interference on the assigned resources, as requested by the serving base station in frame t+Δ. If the interfering terminals reduce their transmit powers, then the serving base station may observe less interference and may be able to correctly decode the packet with one or few transmissions. However, if the interfering terminals decide not to reduce their transmit powers, then the serving base station may still be able to correctly decode the packet after more transmissions. The number of transmissions to send for the packet may thus be dependent on whether interference mitigation is achieved and may be adaptively handled with HARQ.

In the design shown in FIG. 7, there is a delay of M frames from the time the terminal sends a resource request in frame t to the time the first transmission is sent in frame t+M. The design in FIG. 7 thus reduces initial latency from 2M frames to M frames.

In another design, the terminal may send a first transmission of a packet on designated resources in frame t, concurrent with or without a resource request. The designated resources may be pre-assigned to the terminal or conveyed in other manners. This design may correspond to the design shown in FIG. 5 for the forward link. A rate may be selected as described above.

Figure 8:
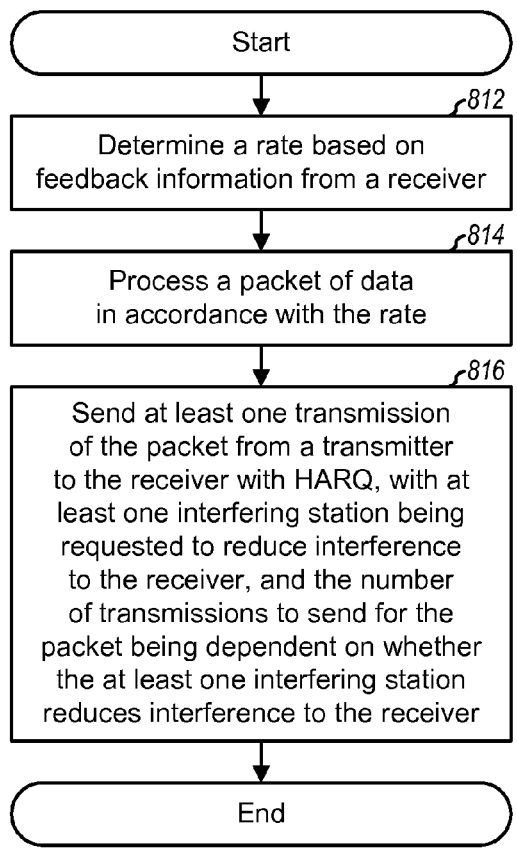
FIG. 8 shows a process for transmitting data.

FIG. 8 shows a design of a process 800 for transmitting data in a wireless communication system. Process 800 may be performed by a transmitter, which may be a base station for data transmission on the forward link or a terminal for data transmission on the reverse link.

The transmitter may determine a rate based on feedback information from a receiver (block 812). The feedback information may comprise pilot measurements, a C/I, a rate, and/or other information. In one design, the transmitter may select the rate based on a late target termination for a packet and assuming that at least one interfering station does not reduce interference to the receiver. In another design, the transmitter may select the rate based on an early target termination for the packet and assuming the at least one interfering station reduces interference to the receiver. The rate may also be selected in other manners, as described above.

The transmitter may process a packet of data in accordance with the rate (block 814). The transmitter may send at least one transmission of the packet to the receiver with HARQ (block 816). At least one interfering station may be requested to reduce interference to the receiver. The number of transmissions to send for the packet may be dependent on whether the at least one interfering station reduces interference to the receiver. The transmitter may terminate transmission of the packet early if it is decoded correctly by the receiver early due to low interference from the at least one interfering station with successful interference mitigation. The transmitter may terminate transmission of the packet late if it is decoded correctly by the receiver late due to high interference from the at least one interfering station with unsuccessful interference mitigation.

Figure 9:
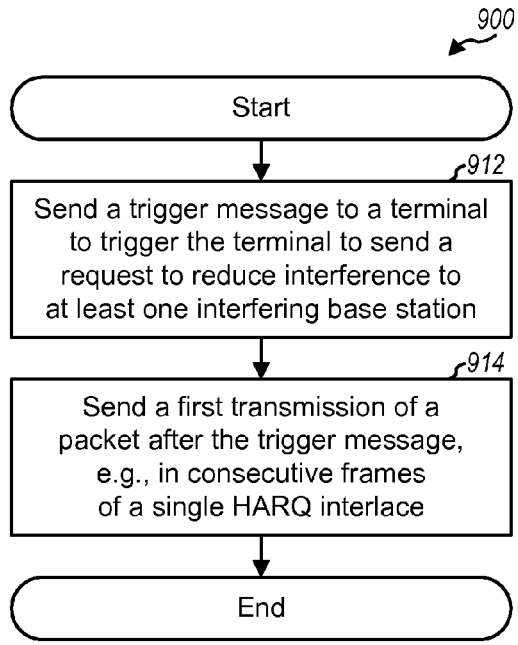
FIG. 9 shows a process for transmitting data on the forward link.

FIG. 9 shows a design of a process 900 for transmitting data on the forward link. Process 900 may be used for block 816 in FIG. 8, with the transmitter being a base station, the receiver being a terminal, an interfering station being an interfering base station, and the at least one transmission of the packet being sent on the forward link.

The base station may send a trigger message to the terminal to trigger the terminal to send a request to reduce interference to at least one interfering base station (block 912). In one design, the base station may send a first transmission of the packet after the trigger message in consecutive frames of a single HARQ interlace, e.g., in frames t and t+M in FIG. 4 (block 914). In this design, the first transmission may observe less interference if the request to reduce interference is granted by the interfering base station(s). In another design, the base station may send the first transmission of the packet along with the trigger message in the same frame, e.g., frame t in FIG. 5. In this design, the first transmission may observe high interference from the interfering base station(s).

Figure 10:
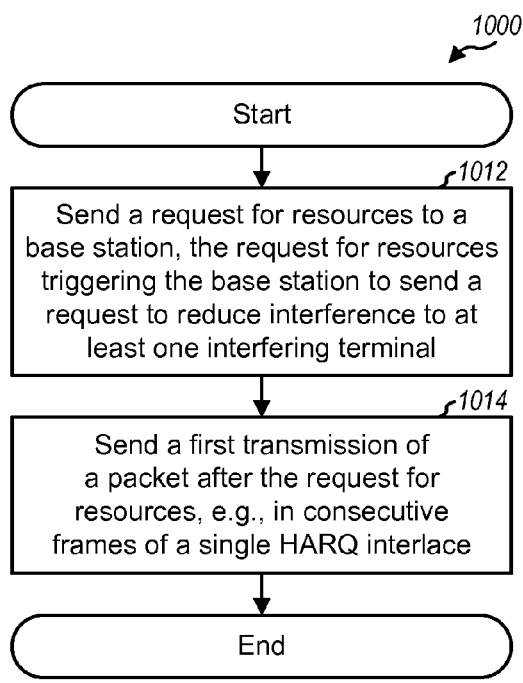
FIG. 10 shows a process for transmitting data on the reverse link.

FIG. 10 shows a design of a process 1000 for transmitting data on the reverse link. Process 1000 may be used for block 816 in FIG. 8, with the transmitter being a terminal, the receiver being a base station, an interfering station being an interfering terminal, and the at least one transmission of the packet being sent on the reverse link.

The terminal may send a request for resources to the base station, with the request for resources triggering the base station to send a request to reduce interference to at least one interfering terminal (block 1012). The terminal may send a first transmission of the packet after the request for resources in consecutive frames of a single HARQ interlace, e.g., in frames t and t+M in FIG. 7 (block 1014). The first transmission may observe less interference if the request to reduce interference is granted by the interfering terminal(s).

Figure 11:
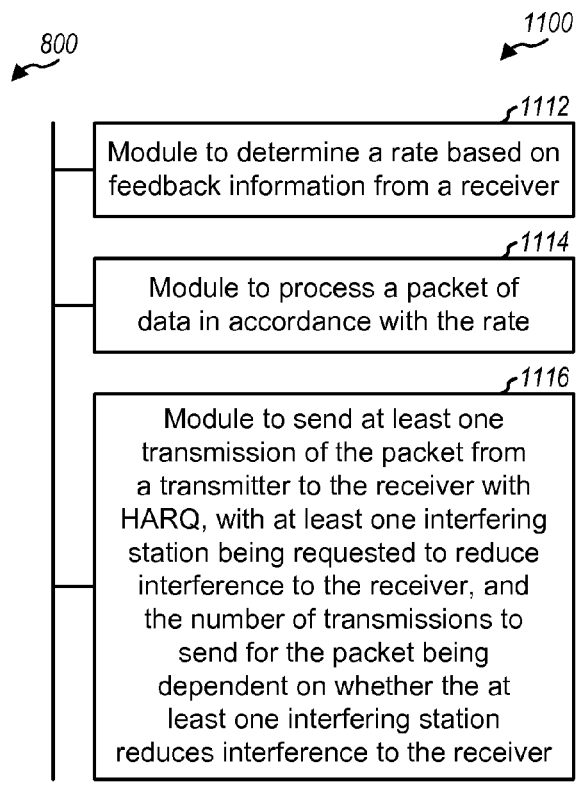
FIG. 11 shows an apparatus for transmitting data.

FIG. 11 shows a design of an apparatus 1100 for transmitting data in a wireless communication system. Apparatus 1100 includes a module 1112 to determine a rate based on feedback information from a receiver, a module 1114 to process a packet of data in accordance with the rate, and a module 1116 to send at least one transmission of the packet to the receiver with HARQ, with at least one interfering station being requested to reduce interference to the receiver, and the number of transmissions to send for the packet being dependent on whether the at least one interfering station reduces interference to the receiver.

FIG. 12 shows a design of a process 1200 for receiving data in a wireless communication system. Process 1200 may be performed by a receiver, which may be a terminal for data transmission on the forward link or a base station for data transmission on the reverse link. The receiver may send to the transmitter feedback information comprising pilot measurements, a C/I, a rate, etc. (block 1212). The receiver may receive at least one transmission of a packet of data sent by the transmitter with HARQ (block 1214). The receiver may decode the at least one received transmission to recover the packet (block 1216). At least one interfering station may be requested to reduce interference to the receiver. The number of transmissions used to correctly decode the packet may be dependent on whether the at least one interfering station reduces interference to the receiver.

In one design, the receiver is a terminal, the transmitter is a base station, and the packet is received on the forward link. The terminal/receiver may receive a trigger message from the base station and, in response, may send a request to reduce interference to at least one interfering base station. In one design, the terminal may receive a first transmission of the packet after the trigger message in consecutive frames of a single HARQ interlace, e.g., as shown in FIG. 4. In this design, the first transmission may observe less interference if the request to reduce interference is granted by the interfering base station(s). In another design, the terminal may receive the first transmission of the packet along with the trigger message in the same frame, e.g., as shown in FIG. 5. In this design, the first transmission may observe high interference from the interfering base station(s).

In another design, the receiver is a base station, the transmitter is a terminal, and the packet is received on the reverse link. The base station/receiver may receive a request for resources from the transmitter and, in response, may send a request to reduce interference to at least one interfering terminal. The base station may receive a first transmission of the packet after the request for resources in consecutive frames of a single HARQ interlace, e.g., as shown in FIG. 7. In this design, the first transmission may observe less interference if the request to reduce interference is granted by the interfering terminal(s).

FIG. 13 shows a design of an apparatus 1300 for receiving data in a wireless communication system. Apparatus 1300 includes a module 1312 to send to a transmitter feedback information comprising pilot measurements, a C/I, a rate, etc., a module 1314 to receive at least one transmission of a packet of data sent by the transmitter to a receiver with HARQ, and a module 1316 to decode the at least one received transmission to recover the packet, with at least one interfering station being requested to reduce interference to the receiver, and the number of transmissions used to correctly decode the packet being dependent on whether the at least one interfering station reduces interference to the receiver.

The modules in FIGS. 11 and 13 may comprise processors, electronics devices, hardware devices, electronics components, logical circuits, memories, etc., or any combination thereof.

Figure 14:
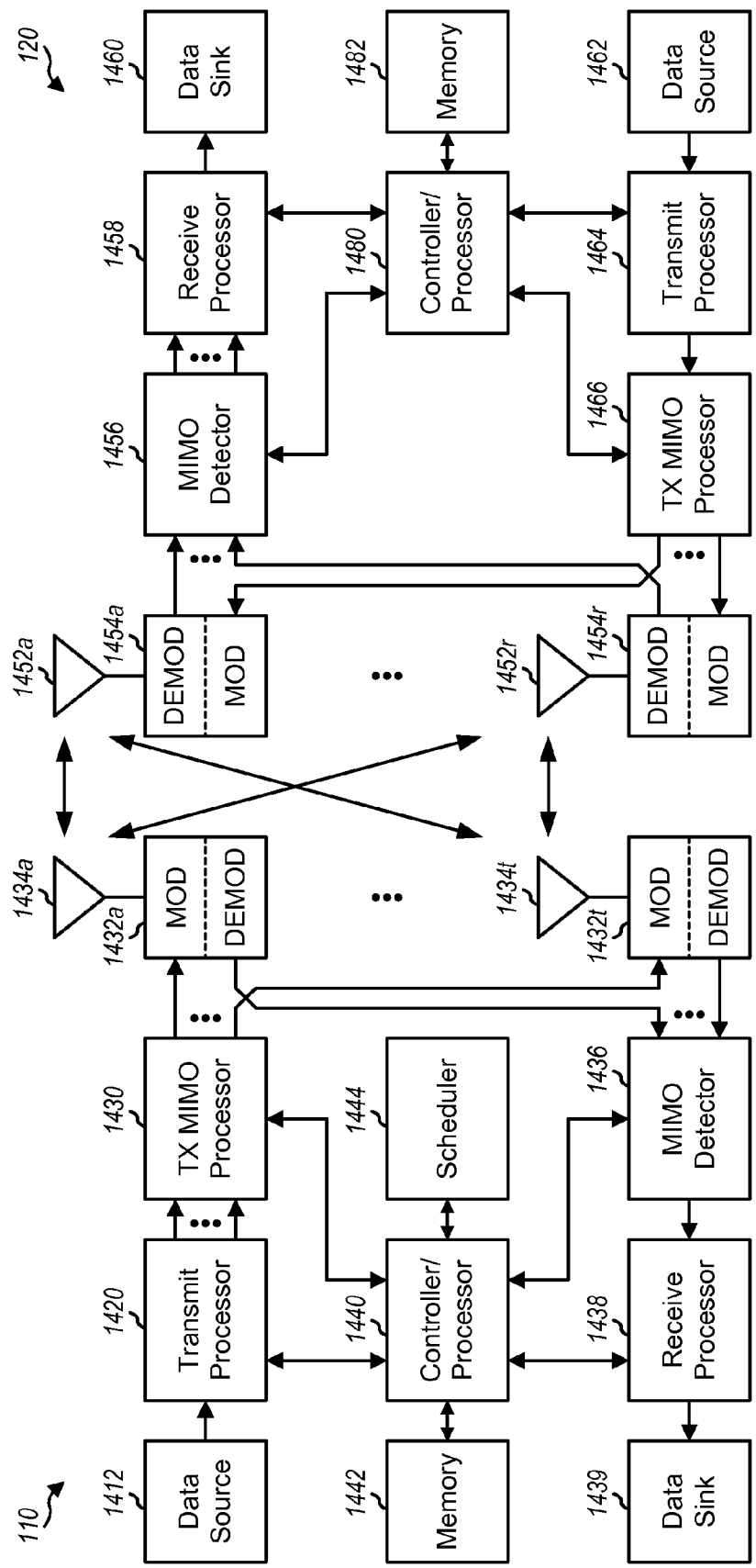
FIG. 14 shows a block diagram of a base station and a terminal.

FIG. 14 shows a block diagram of a design of a base station 110 and a terminal 120, which may be one of the base stations and one of the terminals in FIG. 1. In this design, base station 110 is equipped with T antennas 1434a through 1434t, and terminal 120 is equipped with R antennas 1452a through 1452r, where in general $T \geq 1$ and $R \geq 1$.

At base station 110, a transmit processor 1420 may receive packets of data from a data source 1412 and messages from a controller/processor 1440. For example, controller/processor 1440 may provide resource grants as well as messages for interference mitigation shown in FIGS. 3 through 7. Transmit processor 1420 may process (e.g., encode, interleave, and symbol map) the data packets, messages, and pilot and provide data symbols, signaling symbols, and pilot symbols, respectively. A transmit (TX) multiple-input multiple-output (MIMO) processor 1430 may perform spatial processing (e.g., preceding) on the data symbols, the signaling symbols, and/or the pilot symbols, if applicable, and may provide T output symbol streams to T modulators (MODs) 1432a through 1432t. Each modulator 1432 may process a respective output symbol stream (e.g., for OFDM, SC-FDM, etc.) to obtain an output sample stream. Each modulator 1432 may further process (e.g., convert to analog, amplify, filter, and upconvert) the output sample stream to obtain a forward link signal. T forward link signals from modulators 1432a through 1432t may be transmitted via T antennas 1434a through 1434t, respectively.

At terminal 120, antennas 1452a through 1452r may receive the forward link signals from base station 110 and may provide received signals to demodulators (DEMODs) 1454a through 1454r, respectively. Each demodulator 1454 may condition (e.g., filter, amplify, downconvert, and digitize) a respective received signal to obtain received samples. Each demodulator 1454 may further process the received samples (e.g., for OFDM, SC-FDM, etc.) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate, deinterleave, and decode) the detected symbols, provide decoded packets for terminal 120 to a data sink 1460, and provide decoded messages to a controller/processor 1480.

On the reverse link, at terminal 120, a transmit processor 1464 may receive and process packets of data from a data source 1462 and messages (e.g., for resource requests and interference mitigation) from controller/processor 1480. The symbols from transmit processor 1464 may be precoded by a TX MIMO processor 1466 if applicable, further processed by modulators 1454a through 1454r, and transmitted to base station 110. At base station 110, the reverse link signals from terminal 120 may be received by antennas 1434, processed by demodulators 1432, detected by a MIMO detector 1436 if applicable, and further processed by a receive processor 1438 to obtain the decoded packets and messages transmitted by terminal 120.

Controllers/processors 1440 and 1480 may direct the operation at base station 110 and terminal 120, respectively. Controller/processor 1440 at base station 110 and/or controller/processor 1480 at terminal 120 may perform or direct process 800 in FIG. 8, process 900 in FIG. 9, process 1000 in FIG. 10, process 1200 in FIG. 12, and/or other processes for the techniques described herein. Memories 1442 and 1482 may store data and program codes for base station 110 and terminal 120, respectively. A scheduler 1444 may schedule terminals for data transmission on the forward and/or reverse links and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data in a wireless communication system, comprising:
   processing a packet of data;
   requesting of at least one interfering transmission source an interference mitigation to reduce an interference to a receiver; and sending at least one transmission of the packet from a transmitter to the receiver with hybrid automatic retransmission (HARQ), wherein the number of transmissions for sending the packet is dependent, at least in part, on whether the requesting interference mitigation is successful or unsuccessful, wherein successful includes the at least one interfering transmission source reducing the interference to the receiver.

2. The method of claim 1, further comprising:
terminating transmission of the packet early upon early correct decoding by the receiver due to low interference from the at least one interfering transmission source in association with successful interference mitigation; and
terminating transmission of the packet late upon late correct decoding by the receiver late due to high interference from the at least one interfering transmission source associated with unsuccessful interference mitigation.

3. The method of claim 1, wherein the transmitter is a base station and the receiver is a terminal, and wherein the at least one transmission of the packet is sent on forward link.

4. The method of claim 1, wherein requesting interference mitigation includes sending a trigger message to the receiver to trigger the receiver to send a request to reduce interference to the at least one interfering transmission source.

5. The method of claim 4, wherein the sending the at least one transmission of the packet comprises sending a first transmission of the packet after the trigger message in consecutive frames of a single HARQ interlace.

6. The method of claim 4, wherein the sending the at least one transmission of the packet comprises sending a first transmission of the packet along with the trigger message.

7. The method of claim 1, wherein the transmitter is a terminal and the receiver is a base station, and wherein the at least one transmission of the packet is sent on reverse link.

8. The method of claim 1, further comprising:
sending a request for resources to the receiver, wherein requesting interference mitigation comprises the request for resources triggering the receiver to send a request to reduce interference to the at least one interfering transmission source.

9. The method of claim 8, wherein the sending the at least one transmission of the packet comprises sending a first transmission of the packet after the request for resources in consecutive frames of a single HARQ interlace.

10. The method of claim 1, further comprising:
selecting a rate for transmitting the packet based on a late target termination for the packet, wherein the selecting assumes requesting interference mitigation is unsuccessful and the at least one interfering transmission source does not reduce interference to the receiver.

11. The method of claim 1, further comprising:
selecting a rate for transmitting the packet based on an early target termination for the packet, wherein the selecting assumes requesting interference mitigation is successful and the at least one interfering transmission source reduces interference to the receiver.

12. The method of claim 1, further comprising:
receiving from the receiver a feedback information comprising at least one of pilot measurements and a carrier-to-interference ratio (C/I); and
determining a rate for transmitting the packet based on the feedback information.

13. The method of claim 1, wherein the transmitter is a serving base station, the receiver is a terminal served by the serving base station, and the interfering transmission source is an interfering base station, the method further comprising providing the serving base station with an information identifying the interfering base station, wherein requesting of the interfering transmission source an interference mitigation comprises:
sending an interference mitigation request trigger message from the serving base station to the terminal, and
sending a reduce interference request message from the terminal to the interfering base station, in response to the interference mitigation request trigger message.

14. The method of claim 13, wherein requesting of the interfering transmission source an interference mitigation further comprises receiving at the terminal a decision pilot from the interfering base station, wherein the method further comprises:
estimating, at the terminal, channel conditions based at least in part on the received decision pilot;
sending an estimated channel condition information, based on a result of the estimating channel conditions, from the terminal to the serving base station; and
selecting, at the serving base station, a transmission rate based, at least in part, on the received estimated channel condition,
wherein the sending at least one transmission of the packet from the transmitter is according to the transmission rate.

15. The method of claim 1, wherein the transmitter is a terminal, the receiver is a serving base station, and the interfering transmission source is an interfering terminal, wherein requesting of the interfering transmission source an interference mitigation comprises sending from the serving base station to the interfering terminal a reduce interference request message, wherein the method further comprises:
receiving at the serving base station a power decision pilot from the terminal and a power decision pilot from the interfering terminal;
generating a reverse link grant at the serving base station based, at least in part, on power decision pilots; and
sending the reverse link grant to the terminal,
wherein the sending at least one transmission of the packet from the transmitter includes sending the at least one transmission from the terminal to the serving base station at a rate according to the reverse link grant.

16. The method of claim 15, further comprising:
receiving at the terminal another reduce interference request message from a neighbor base station;
determining at the terminal a maximum transmit power level based, at least in part, on at least one of the reduce interference request message received from the serving base station and the reduce interference request message received from the neighbor base station; and
generating at the terminal, the power decision pilot that is received at the serving base station, based at least in part on the determined maximum transmit power level.

17. An apparatus for wireless communication, comprising:
at least one processor configured to process a packet of data, and configured to send at least one transmission of the packet from a transmitter to a receiver with hybrid automatic retransmission (HARQ), wherein the processor is configured to request of at least one interfering transmission source a reducing of an interference to the receiver, and wherein the number of transmissions for sending the packet is dependent, at least in part, on whether the requesting interference mitigation is successful or unsuccessful, wherein successful includes the at least one interfering transmission source reducing the interference to the receiver.

18. The apparatus of claim 17, wherein the request of at least one transmission source a reducing of an interference includes sending a trigger message to the receiver, to trigger the receiver to send a request to reduce interference to the at least one interfering transmission source, and wherein the at least one processor is configured to send a first transmission of the packet after the trigger message in consecutive frames of a single HARQ interlace.

19. The apparatus of claim 17, wherein the request of at least one interfering transmission source a reducing of an interference includes sending a trigger message to the receiver, to trigger the receiver to send a request to reduce interference to the at least one interfering transmission source, and wherein the at least one processor is configured to send a first transmission of the packet along with the trigger message.

20. The apparatus of claim 17, wherein the at least one processor is configured to send a request for resources to the receiver, wherein the at least one processor is configured to request of the interfering station a reducing of an interference by including a mitigation of interference message with the request for resources, for triggering the receiver to send a request to reduce interference to the at least one interfering transmission source, and to send a first transmission of the packet after the request for resources in consecutive frames of a single HARQ interlace.

21. The apparatus of claim 17, wherein the transmitter is a serving base station, the receiver is a terminal served by the serving base station, and the interfering transmission source is an interfering base station, wherein the at least one processor configured to request of the interfering transmission source an interference mitigation is configured to include in performing said request:
sending an interference mitigation request trigger message from the serving base station to the terminal, and
sending a reduce interference request message from the terminal to the interfering base station, in response to the interference mitigation request trigger message.

22. The apparatus of claim 21, wherein requesting of the interfering transmission source an interference mitigation further comprises receiving at the terminal a decision pilot from the interfering base station, wherein the at least one processor is configured to:
estimate channel conditions at the terminal based at least in part on the received decision pilot;
send an estimated channel condition information from the terminal to the serving base station based on a result of the estimating channel conditions; and
select, at the serving base station, a transmission rate based, at least in part, on the received estimated channel condition,
wherein the at least one processor is configured to send at least one transmission of the packet from the transmitter according to the transmission rate.

23. The apparatus of claim 17, wherein the transmitter is a terminal, the receiver is a serving base station, and the interfering transmission source is an interfering terminal, wherein requesting of the interfering transmission source an interference mitigation comprises sending from the serving base station to the interfering terminal a reduce interference request message, wherein the at least one processor is further configured to:
receive at the serving base station a power decision pilot from the terminal and a power decision pilot from the interfering terminal;
generate a reverse link grant at the serving base station based, at least in part, on power decision pilots; and
send the reverse link grant to the terminal,
wherein the at least one processor is configured to include in the sending at least one transmission of the packet from the transmitter a sending of at least one transmission from the terminal to the serving base station at a rate according to the reverse link grant.

24. An apparatus for wireless communication, comprising:
means for processing a packet of data;
means for requesting of at least one interfering transmission source an interference mitigation to reduce an interference to a receiver; and
means for sending at least one transmission of the packet from a transmitter to the receiver with hybrid automatic retransmission (HARQ), wherein the number of transmissions for sending the packet is dependent, at least in part, on whether the requesting interference mitigation is successful or unsuccessful, wherein successful includes the at least one interfering transmission source reducing the interference to the receiver.

25. The apparatus of claim 24, wherein requesting interference mitigation includes sending a trigger message to the receiver to trigger the receiver to send a request to reduce interference to the at least one interfering transmission source, and
wherein the means for sending the at least one transmission of the packet comprises means for sending a first transmission of the packet after the trigger message in consecutive frames of a single HARQ interlace.

26. The apparatus of claim 24, wherein requesting interference mitigation includes sending a trigger message to the receiver to trigger the receiver to send a request to reduce interference to the at least one interfering transmission source, and
wherein the means for sending the at least one transmission of the packet comprises means for sending a first transmission of the packet after the request for resources in consecutive frames of a single HARQ interlace.

27. The apparatus of claim 24, wherein the at least one process is further configured to:
receive at the terminal another reduce interference request message from a neighbor base station;
determine at the terminal a maximum transmit power level based, at least in part, on at least one of the reduce interference request message received from the serving base station and the reduce interference request message received from the neighbor base station; and
generate at the terminal, the power decision pilot that is received at the serving base station, based at least in part on the determined maximum transmit power level.

28. The apparatus of claim 24, wherein the transmitter is a serving base station, the receiver is a terminal served by the serving base station, and the interfering transmission source is an interfering base station, wherein the means for requesting of the interfering transmission source an interference mitigation comprises:
means for sending an interference mitigation request trigger message from the serving base station to the terminal, and
means sending a reduce interference request message from the terminal to the interfering base station, in response to the interference mitigation request trigger message.

29. The apparatus of claim 28, wherein requesting of the interfering transmission source an interference mitigation further comprises receiving at the terminal a decision pilot from the interfering base station, wherein the apparatus further comprises:
means for estimating, at the terminal, channel conditions based at least in part on the received decision pilot;

means for sending an estimated channel condition information, based on a result of the estimating channel conditions, from the terminal to the serving base station; and
means for selecting, at the serving base station, a transmission rate based, at least in part, on the received estimated channel condition,
wherein the sending at least one transmission of the packet from the transmitter is according to the transmission rate.

30. The apparatus of claim 24, wherein the transmitter is a terminal, the receiver is a serving base station, and the interfering transmission source is an interfering terminal, wherein requesting of the interfering transmission source an interference mitigation comprises sending from the serving base station to the interfering terminal a reduce interference request message, wherein the apparatus further comprises:
means for receiving at the serving base station a power decision pilot from the terminal and a power decision pilot from the interfering terminal;
means for generating a reverse link grant at the serving base station based, at least in part, on power decision pilots; and
means for sending the reverse link grant to the terminal, wherein the sending at least one transmission of the packet from the transmitter includes sending the at least one transmission from the terminal to the serving base station at a rate according to the reverse link grant.

31. The apparatus of claim 30, further comprising:
means for receiving at the terminal another reduce interference request message from a neighbor base station;
means for determining at the terminal a maximum transmit power level based, at least in part, on at least one of the reduce interference request message received from the serving base station and the reduce interference request message received from the neighbor base station; and
means for generating at the terminal, the power decision pilot that is received at the serving base station, based at least in part on the determined maximum transmit power level.

32. A computer program product, comprising:
a non-transitory computer-readable medium comprising:
code for causing at least one computer to process a packet of data, and
code for causing the at least one computer to request of at least one interfering transmission source a reducing of an interference to a receiver;
code for causing the at least one computer to send at least one transmission of the packet from a transmitter to the receiver with hybrid automatic retransmission (HARQ),
wherein the number of transmissions to send for the packet is dependent, at least in part, on whether the requesting interference mitigation is successful or unsuccessful, wherein successful includes the at least one interfering transmission source reducing the interference to the receiver.

33. The computer program product of claim 32, wherein the transmitter is a serving base station, the receiver is a terminal served by the serving base station, and the interfering transmission source is an interfering base station, wherein the code for causing the at least one computer to request of the interfering transmission source an interference mitigation includes code for causing the at least one computer to:
send an interference mitigation request trigger message from the serving base station to the terminal, and
send a reduce interference request message from the terminal to the interfering base station, in response to the interference mitigation request trigger message.

34. The computer program product of claim 33, wherein the code for causing the at least one computer to request of the interfering transmission source an interference mitigation further comprises code for causing the at least one computer to receive at the terminal a decision pilot from the interfering base station, wherein the at least computer program product further includes:
code for causing the at least one computer to estimate channel conditions at the terminal based at least in part on the received decision pilot;
code for causing the at least one computer to send an estimated channel condition information from the terminal to the serving base station based on a result of the estimating channel conditions; and
code for causing the at least one computer to select, at the serving base station, a transmission rate based, at least in part, on the received estimated channel condition,
wherein the transmission of the packet from the transmitter according to the transmission rate.

35. The computer program product of claim 32, wherein the transmitter is a terminal, the receiver is a serving base station, and the interfering transmission source is an interfering terminal, wherein requesting of the interfering transmission source an interference mitigation comprises sending from the serving base station to the interfering terminal a reduce interference request message, wherein computer program product further includes:
code for causing the at least one computer to receive at the serving base station a power decision pilot from the terminal and a power decision pilot from the interfering terminal;
code for causing the at least one computer to generate a reverse link grant at the serving base station based, at least in part, on power decision pilots; and
code for causing the at least one computer to send the reverse link grant to the terminal,
wherein the code for causing the at least one computer to send at least one transmission of the packet from the transmitter to the receiver includes code for causing the at least one computer to include in the sending at least one transmission of the packet from the terminal to the serving base station at a rate according to the reverse link grant.

36. The computer program product of claim 32, further comprising:
code for causing the at least one computer to receive at the terminal another reduce interference request message from a neighbor base station;
code for causing the at least one computer to determine at the terminal a maximum transmit power level based, at least in part, on at least one of the reduce interference request message received from the serving base station and the reduce interference request message received from the neighbor base station; and
code for causing the at least one computer to generate at the terminal, the power decision pilot that is received at the serving base station, based at least in part on the determined maximum transmit power level.

37. A method of receiving data in a wireless communication system, comprising:
receiving at least one transmission of a packet of data sent by a transmitter to a receiver with hybrid automatic retransmission (HARQ);

decoding the at least one received transmission to recover the packet; and requesting at least one interfering transmission source to reduce interference to the receiver, wherein the number of transmissions used to correctly decode the packet is dependent, at least in part, on whether the requesting at least one interfering transmission source to reduce interference is successful or unsuccessful, wherein successful includes the at least one interfering transmission source reducing interference to the receiver.

38. The method of claim 37, wherein requesting at least one interfering transmission source to reduce interference comprises:

receiving a trigger message from the transmitter; and sending a request to reduce interference to at least one interfering transmission source in response to receiving the trigger message.

39. The method of claim 38, wherein the receiving the at least one transmission of the packet comprises receiving a first transmission of the packet, and wherein the trigger message is with the first transmission.

40. The method of claim 38, wherein the receiving the at least one transmission of the packet comprises receiving a first transmission of the packet after the trigger message in consecutive frames of a single HARQ interlace.

41. The method of claim 37, further comprising: receiving a request for resources from the transmitter, and wherein requesting at least one interfering transmission source to reduce interference comprises sending a request to reduce interference to at least one interfering transmission source in response to receiving the request for resources.

42. The method of claim 41, wherein the receiving the at least one transmission of the packet comprises receiving a first transmission of the packet after the request for resources in consecutive frames of a single HARQ interlace.

43. The method of claim 37, further comprising:

sending to the transmitter feedback information comprising at least one of pilot measurements and a carrier-to-interference ratio (C/I).

44. An apparatus for wireless communication, comprising:

at least one processor configured to receive at least one transmission of a packet of data sent by a transmitter to a receiver with hybrid automatic retransmission (HARQ), and to decode the at least one received transmission to recover the packet; and at least one processor configured to request at least one interfering transmission source to reduce interference to the receiver, wherein the number of transmissions used to correctly decode the packet is dependent, at least in part, on whether the requesting at least one interfering transmission source to reduce interference is successful or unsuccessful, wherein successful includes the at least one interfering transmission source reducing interference to the receiver.

45. The apparatus of claim 44, wherein the at least one processor is configured to receive a trigger message from the transmitter, to send a request to reduce interference to the at least one interfering transmission source in response to receiving the trigger message, and to receive a first transmission of the packet after the trigger message in consecutive frames of a single HARQ interlace.

46. The apparatus of claim 44, wherein the at least one processor is configured to receive a request for resources from the transmitter, to send a request to reduce interference to the at least one interfering transmission source in response to receiving the request for resources, and to receive a first transmission of the packet after the request for resources in consecutive frames of a single HARQ interlace.

* * * * *